No. 11,698. Reissued Oct. 18, 1898.

C. O. NELSON.

TOE CLIP FOR BICYCLE PEDALS.

(Application filed Sept. 9, 1898.)

Witnesses:

C. H. McEwen

W. J. Norton

Inventor:

Charles O. Nelson

By Dyrenforth & Dyrenforth his Attys.

THE NORRIS PETERS CO., PHOTO-LITHO., WASHINGTON, D. C.

UNITED STATES PATENT OFFICE.

CHARLES O. NELSON, OF CHICAGO, ILLINOIS, ASSIGNOR OF ONE-HALF TO A. H. PEIRCE, OF SAME PLACE.

TOE-CLIP FOR BICYCLE-PEDALS.

SPECIFICATION forming part of Reissued Letters Patent No. 11,698, dated October 18, 1898.

Original No. 608,620, dated August 9, 1898. Application for reissue filed September 9, 1898. Serial No. 690,597.

*To all whom it may concern:*

Be it known that I, CHARLES O. NELSON, a citizen of the United States, residing at Chicago, in the county of Cook and State of Illinois, have invented a new and useful Improvement in Toe-Clips for Bicycle-Pedals, of which the following is a specification.

My invention relates to an improvement in toe-clips for bicycle-pedals, and more especially to clips for that type of pedal having a central bearing-sleeve for receiving the pedal-crank bearing-pin.

My object is to provide a clip which may be applied to the pedal without the use of any tool, and which, while performing perfectly the function for which it is intended, yet shall be so constructed as to permit its ready detachment in case of emergency or accident.

A further object is to furnish a clip with means for turning the pedal to the right position for inserting the toe into the clip by use of the foot alone. Other features of importance will be pointed out in the description.

Figure 1:
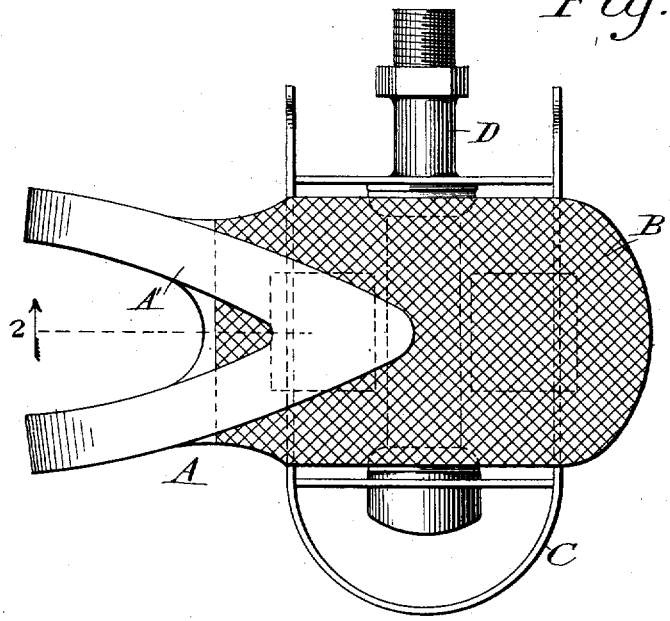
Figure 2:
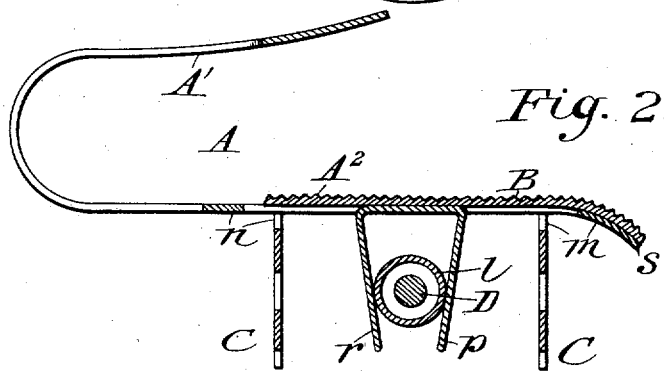

In the accompanying drawings, Figure 1 is a plan view of a detached pedal supplied with my improved toe-clip, and Fig. 2 a vertical section taken on line 2 of Fig. 1 and viewed as indicated by the arrow.

The pedal is preferably constructed to afford a broad bearing-plate for the foot, which rests upon the foot-bearing surface of the pedal and is supplied with downwardly-projecting spring-clamps for engaging the sleeve portion of the pedal.

A is a toe-clip provided with an upwardly and backwardly turned toe-receiving part A′ and with a foot-bearing plate $A^2$, which extends back over the rear portion of the pedal and is curved downward, as shown, to afford a portion *s*, forming an angle with the foot-plate. The plate $A^2$ is provided with downwardly-projecting spring-clamps *r* and *p*, which converge preferably as shown.

The clamps *r* and *p* may be provided by stamping them from the plate $A^2$, as shown, and should be of a width to afford sufficient springiness, but narrow enough to enable the clip to be applied to pedals of varying length.

The foot-bearing surface of the pedal is covered with a roughened rubber sheet or a sheet of any suitable friction material B, which may be cemented, riveted, or otherwise secured to the bearing-surface.

In the application of the toe-clip to a pedal C the plate $A^2$ rests upon the foot-bearing strips *n* and *m*, while the clamps engage the central bearing-sleeve *l* of the pedal, which receives the pedal-crank D.

The clip may be stamped from a sheet of spring-steel or other suitable metal perforated to give sufficient lightness, or it may be formed in any way to give it the properties desired.

A view of Fig. 2 makes it clear that an upward force on the hook A′, producing a downward pressure upon the strip *m*, is resisted by a force exerted upon the clamp *p* by the sleeve *l*, and that should there be a slight yielding under excessive force the clip, owing to the acute angle which the clamp forms with the plate $A^2$, would resume the position immediately when sufficiently relieved from the disturbing force. A similar reaction involving the clamp *r* and strip *n* would follow a downward pressure upon the hook A′. When freed from the foot, the pedal rocks forward, being overbalanced by the superior weight of the front portion of the clip. The curved end portion *s* affords a ready means for righting the pedal with the foot when it is desired to slip the foot into the clip.

In practice I provide clamps *r* and *p* of such degree of stiffness that they will have a sufficient clamping force to prevent any loosening of the pedal under ordinary usage, while in case of emergency or accident they will permit the clip to be readily wrenched from the pedal under a sudden force.

Minor changes in construction within the scope of my invention may be made. Hence I do not wish to be understood as limiting myself in matters of detail by the particular description given above.

What I claim as new, and desire to secure by Letters Patent, is—

1. A toe-clip for pedals having a central bearing for the pedal-crank pin, comprising, in combination, a toe-receiving hook, a foot-bearing plate resting upon the foot-bearing portion of the pedal, and downward-projecting spring-clamps upon said plate embracing said pedal-crank bearing and open below to permit ready disengagement in case of accident, substantially as and for the purpose set forth.

2. The combination with a pedal having a central sleeve or bearing for the pedal-crank, of a toe-clip, comprising a toe-receiving part, a foot-bearing plate resting upon the foot-bearing surface of the pedal, and having a backwardly-projecting part forming an angle with said plate and clamps for engaging said sleeve, said clamps comprising sections stamped from said plate and left unsevered at one portion, as set forth.

CHARLES O. NELSON.

In presence of—

DANIEL W. LEE,

R. T. SPENCER.